Figure 1:
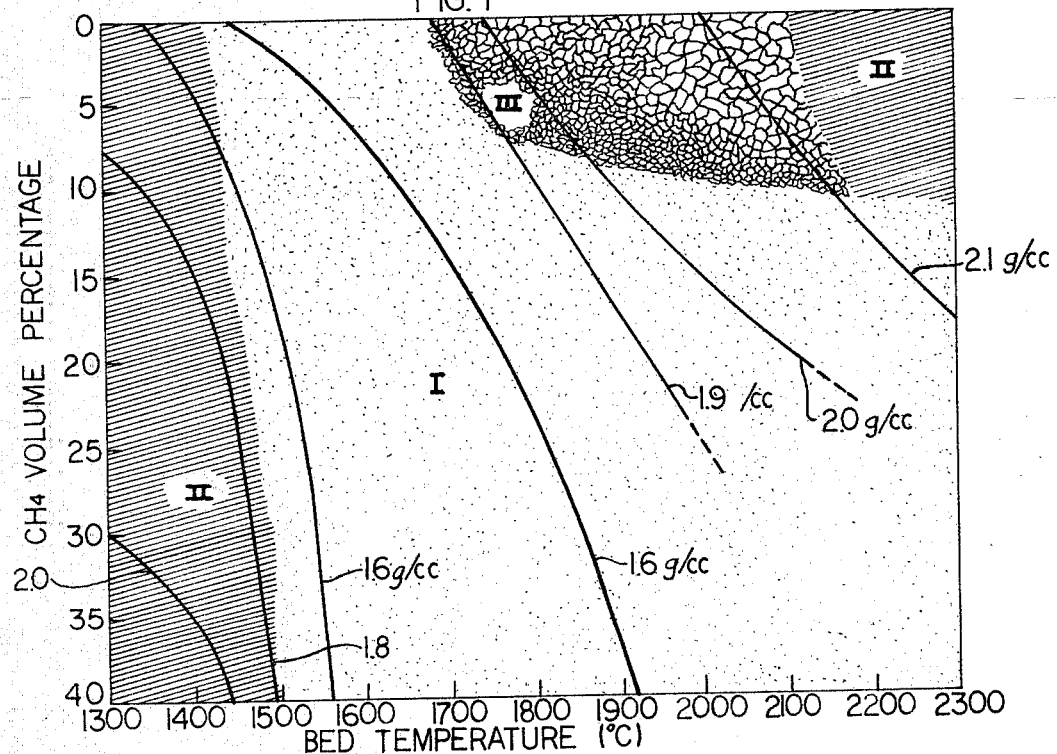

INVENTORS
JACK C. BOKROS
WALTER V. GOEDDEL
JACK CHIN
ROBERT J. PRICE
ATTORNEY

United States Patent Office 3,298,921
Patented Jan. 17, 1967

3,298,921
PYROLYTIC CARBON COATED PARTICLES
FOR NUCLEAR APPLICATIONS
Jack C. Bokros, San Diego, Walter V. Goeddel, Poway, and Jack Chin and Robert J. Price, San Diego, Calif., assignors, by mesne assignments, to the United States of America as represented by the United States Atomic Energy Commission
Filed Oct. 22, 1965, Ser. No. 502,702
10 Claims. (Cl. 176—67)

The invention described herein was made in the course of, or under, Contract AT(04-3)-167, Project Agreement No. 17 with the United States Atomic Energy Commission.

This invention relates to coated articles, and more particularly it relates to pyrolytic carbon-coated particles which have excellent structural stability although exposed to high temperatures and high-level fast neutron irradiation for prolonged periods.

Coated articles having good structural strength at high temperatures and which are structurally stable although exposed to high-level neutron irradiation for prolonged periods have various uses in the field of nuclear energy. For example, such articles may be used for nuclear reactor fuel, in which case the cores of the articles are made of fissile and/or fertile materials. If the coatings are sufficiently impermeable to retain volatile fission products within the confines of the individual articles, such articles may be employed in nuclear reactor fuel elements without requiring ancillary means to trap or remove fission products from the reactor coolant stream.

In addition to nuclear fuels, other materials such as poisons, are often employed within nuclear reactors for various purposes. When the reactors are designed to operate at relatively high temperatures, as for example in the case of gas-cooled reactors, it is likewise important that such poisons be employed in a form wherein they have good high temperature stability and are not adversely affected by prolonged exposure to irradiation. Accordingly, there are advantages to using poisons in coated particulate form.

One example of a coated particle suitable for use in various nuclear energy applications is disclosed in U.S. patent application, Serial No. 272,199, filed April 11, 1963, in the names of Walter V. Goeddel and Charles S. Luby. In this copending application, a coated article is disclosed which comprises a central core having a first coating of a low density, spongy, shock absorbing, pyrolytic carbon thereon which is capable of absorbing thermal stresses and attenuating the fission recoils which occur when a nuclear fuel core is employed. This spongy carbon coating is surrounded with a dense retentive exterior coating. Various types of dense, thermally conductive pyrolytic carbon outer coatings are disclosed including ones which are employed in conjunction with an interior intermediate layer of a material such as silicon carbide, zirconium carbide and niobium carbide. Although these coated particles function quite will for certain applications, coated particles having even better structural strength and high temperature stability are desired.

Figure 2:
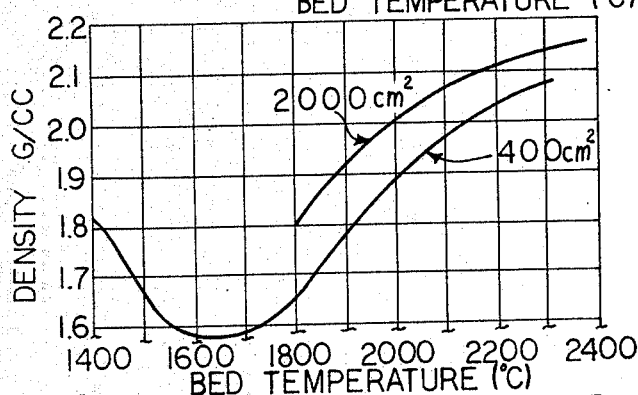
Figure 3:
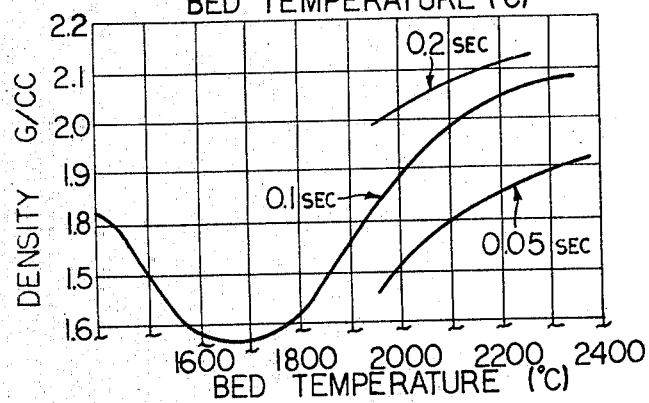

It is a principal object of the present invention to provide coated articles having excellent structural stability when subjected to high temperature operation and high-level neutron irradiation for long periods of time. It is a further object to provide a coated nuclear fuel particle which has excellent retention of fission products when operated for prolonged periods at high temperatures and under exposure to high density neutron irradiation. A still further object is to provide a coated neutron poison particle for use in nuclear energy applications which particle has excellent structural stability when exposed to high temperatures and high density neutron irradiation for prolonged periods of time. These and other objects of the invention are more particularly set forth in the following detailed description of processes and products embodying various features of the invention and in the accompanying drawings wherein:

FIGURE 1 is a graphic illustration of the physical properties of pyrolytic carbon deposited in a fluidized bed from a methane-helium mixture at a contact time of about 0.1 second and an initial fluidized bed surface area of 400 square centimeters;

FIGURE 2 is a graph of the deposition of pyrolytic carbon from a methane-helium mixture containing 20 volume percent methane and a contact time of about 0.1 second illustrating the effect which the change in surface area of the fluidized bed has upon the density of the deposited coating; and FIGURE 3 is a graph of the deposition of pyrolytic carbon from a methane-helium mixture containing 20 volume percent methane upon an intiial fluidized bed surface area of 400 square centimeters illustrating the effect which change in contact time has upon density of the deposited coating.

In general, the present invention provides an article having a central core that is surrounded with a layer of dense, isotropic pyrolytic carbon. Compared to other forms of pyrolytic carbon, it is believed that isotropic carbon can accommodate the largest elastic strain before fracturing and has far superior dimensional stability compared to other types of pyrolytic carbon. For example, it has been found that the use of a jacket of dense isotropic pyrolytic carbon surrounding a core of nuclear fuel material provides a composite article having excellent stability at high temperatures and prolonged neutron irradiation.

Although the following description is generally confined to coated nuclear fuel particles and nuclear poisons, it should be understood that the invention may likely have similar non-nuclear uses in operations wherein high-temperature stability is of importance. As hereinafter used, the term nuclear fuel should be considered to include the elements uranium, thorium, plutonium, and compounds thereof; and the term nuclear poisons should be understood to include those elements and/or compounds which have a high neutron-absorption cross section for neutrons of various energy levels.

The central core comprises the material of which protection is desired and may be of any suitable shape. Preferably, particulate materials are employed which may be conveniently, uniformly coated. Generally, cores are employed which are spheroidal in shape and which are between about 100 microns and about 500 microns in particle size, although larger and smaller particle sizes may be used. Core materials in the carbide form are preferred, however, core materials in other suitable forms, such as the oxide, may also be employed. Examples of suitable nuclear fuel core materials include uranium dicarbide, thorium dicarbide and/or mixtures thereof, uranium oxide, thorium oxide and plutonium oxide. Examples of suitable neutron, poison core materials include boron, gadolinium, samarium, erbium and cadmium, in carbide or other suitable chemical form.

The coatings may take various composite forms so long as there is included at least one continuous jacket of high density pyrolytic carbon. In many instances, it is considered acceptable to employ merely a single layer of high density isotropic pyrolytic carbon, of suitable thickness, whereas in other instances it is desirable to employ at least two layers. In general, the nature of the core and the intended application determine the desirable form of the coating.

For nuclear fuel materials which may expand at high temperature operation and which upon fissioning create gaseous fission products, some provision should be made to accommodate these effects, particularly to allow prolonged exposure to neutron flux. If a dense nuclear fuel core is employed, it is desirable to use a low density layer adjacent the outer surface of the core to provide the desired accommodation at a location interior of the jacket of high density isotropic pyrolytic carbon. If a porous core is employed, it may itself provide the desired accommodation so that the high-density isotropic pyrolytic carbon may be deposited directly upon the outer surface of the porous core. With either of these embodiments, additional layers of suitable substances may be disposed exterior of the high density isotropic carbon jacket or intermediate the two layers in the latter embodiment, without deviating from this invention.

In the multi-layer embodiment, the first layer which surrounds the core should be of a low density substance which is compatible with the core material. For example carbonaceous materials, such as low density isotropic carbon, are considered suitable. However, the preferred substance is spongy carbon. By spongy carbon is meant a soot-like amorphous carbon which has a diffuse X-ray diffraction pattern and which has a density less than 50 percent of the theoretical density of carbon, which is about 2.21 g./cc. Such spongy carbon is porous to gaseous materials and is also compressible. The primary function of the low density layer on a nuclear fuel particle is to attenuate fission recoils, and a secondary function is the accommodation of stresses resulting from differential thermal expansion between the core and the dense isotropic carbon outer layer and any other dimensional changes in the core or in the outer layer due to exposure to neutron irradiation for a prolonged period.

In general, to accomplish the aforementioned function of stress accommodation, it is believed that the low density layer should have a thickness of at least about 20 microns, and it should have a density at least about 25% less than the density of the dense isotropic carbon layer. For example, if the outer layer has a density of 2.0 g./cc., the low density layer should be no more dense than 1.5 g./cc. A difference in density of this amount assures that the inner low density layer will undergo a sufficiently greater amount of shrinkage than the high density layer so that shrinkage of the outer layer to a degree can be tolerated because stresses radiating from the interface with the inner layer do not result therefrom. Moreover, when the core is made of a nuclear fuel material which fissions with the resultant production of fission products, the thickness of the low density layer should be sufficient that the fission product recoils are attenuated so that cracking or rupturing of the outer coating as a result of damage from fission product recoil is avoided. Accordingly, for nuclear fuel core materials, a spongy coating having a thickness of at least about 25 microns is preferably employed.

The outer layer should have very good impermeability to gas and should be able to maintain a high dimensional stability during fast neutron irradiation. It has been found that high density pyrolytic carbon which is isotropic exhibits these desirable qualities. The measure of whether a carbon coating is isotropic may be determined by measuring the physical properties of the carbon material to determine its Bacon anisotropy factor. The Bacon anisotropy factor is an accepted measure of preferred orientation of the layer planes in the structure. The technique of measurement and a complete explanation of the scale of measurement is set forth in an article by G. E. Bacon entitled "A Method For Determining the Degree of Orientation of Graphite" which appeared in the Journal of Applied Physics, volume 6, page 477 (1956). For purposes of this application, the term "isotropic carbon" is defined as carbon which measures between 1.0 (the lowest point on the Bacon scale) and about 1.3 on the Bacon scale.

Dense isotropic pyrolytic carbon, as defined above, has been found to have good thermal conductivity in any direction therethrough and to have high fracture strength. It has also been found that dense nearly isotropic pyrolytic carbon in this range shows a dimensional change of less than about 4% after subjection to about 1040° C. and $2.4 \times 10^{21}$ NVT ($>0.18$ m.e.v.). Theoretical considerations predict 0.0 dimensional change for completely isotropic fully dense carbon. Accordingly, when an outer layer of pyrolytic isotropic carbon is employed to jacket an article coated with a first layer of low density spongy or isotropic carbon, a product is produced which remains stable although exposed to high temperatures and high-density neutron irradiation for prolonged periods of time.

In general, the thickness of the overall multi-layer coating depends upon the size of the core. As a general rule, the thickness of the composite coating should be at least about forty percent of the size of the core, with the dense isotropic carbon layer being a minimum of about 10 microns thick for effectiveness. For nuclear fuel particles, a coating of this total thickness is considered to adequately accommodate fuel burnup up to about 20% of the metal atoms, at a reactor temperature of 1500° C. and a fast flux of $1 \times 10^{22}$ NVT ($>0.18$ m.e.v.). For example, if the articles being coated are particles in a size range of about 200 microns diameter, the total thickness of the coating should be at least about 80 microns. For a two-layer coating, of the type previously described, 80 microns thick, the inner or first coating of low density carbon is about 20 to 25 microns in thickness, and the outer dense isotropic carbon constitutes the remainder of the thickness. However, once a certain minimum thickness of the high density isotropic pyrolytic carbon layer is reached this ratio need not strictly apply.

Because of the considerations of nuclear reactor design, coatings of a total thickness more than about half the size of the core will probably not be employed for nuclear reactor fuels because of the low fuel loading to volume ratio they would have. However, it should be understood that thicker coatings do not detract from the other advantages which these coatings possess but further increase their strength and resistance to passage of fission products.

As mentioned previously, the inclusion of an additional layer or layers either intermediate the low density layer and the high density isotropic carbon layer, or exterior of the high density isotropic layer, does not change the important advantages which are gained by the employment of the high density isotropic carbon layer in an article of this type. Therefore, as desired, the article may also contain such additional intermediate and/or exterior layers, made of substances which are compatible with the high density isotropic carbon layer, without deviating from the present invention.

As previously stated, when a porous core of nuclear fuel material is employed, it is acceptable to use only a jacket of high density isotropic pyrolytic carbon instead of the multi-layer embodiment. High density isotropic pyrolytic carbon is considered to have good resistance to damage from fission recoils so that use of this substance immediately adjacent fissionable material, without the protection of a low density spongy or isotropic layer, is considered to have no known disadvantage. The required porosity which the nuclear material core should have to provide the inherent accommodation of the aforementioned effects is dependent upon the contemplated amount of burnup to which the fuel particles will be subjected in their lifetime. For an intended burnup of about 10 atom percent, fuel particles having a density about 85% or less of the theoretical maximum density may be acceptably coated with a single layer of high density isotropic carbon to provide the desired improvement. For greater amounts of burnup, a correspondingly more porous fuel particle core should be employed. Likewise, when coating materials, such as certain nuclear poisons, which do not experience fissioning or substantial expansion due to thermal or irradiation effects, a single coating of high density isotropic carbon may also be effectively employed.

The minimum thickness considered suitable for such a single layer article is the same as enumerated above for the multi-layer particle. For operating conditions with the exterior of the coating at a temperature of about 1500° C., at exposure to a fast flux of about $1 \times 10^{22}$ NVT (>0.18 m.e.v.) and for burnup to about 20 atom percent of the metal nuclides, the minimum thickness of the dense isotropic carbon should be equal to at least about 40% of the size of the core.

The preferred method of coating the articles with a layer of isotropic carbon is by deposition of pyrolytic carbon by high-temperature decomposition of gaseous hydrocarbons. When the articles being coated are relatively small particles, the coating operation can be efficiently carried out using a fluidized bed process in which the hydrocarbon gas, or a mixture of the hydrocarbon and a carrier gas, are used to levitate a bed of the particles being coated.

An inner coating of spongy pyrolytic carbon may likewise be deposited on the cores by decomposition of gaseous hydrocarbons, as is described in detail in the aforementioned copending U.S. patent application. When the low density, spongy, pyrolytic carbon coating is applied by fluidized bed coating the particles may be dispersed as a fluidized bed in an upwardly moving stream of helium or some other suitable inert gas and heated to a temperature between about 800° C. to about 1400° C. A substance which is capable of producing low density, spongy, pyrolytic carbon upon decomposition, e.g., acetylene gas at a relatively high partial pressure, i.e., between about 0.65 to about 1.00, is mixed with the stream of helium gas or substituted therefor. Alternately, other substances which provide low density, spongy, pyrolytic carbon upon decomposition may be employed. At temperatures above 800° C. the acetylene gas decomposes and forms a low density, spongy, pyrolytic carbon coating upon the surface of the particles. When the desired thickness of low density, spongy carbon, e.g., 20 to 50 microns, has been deposited upon the surface of the particles, the flow of acetylene gas is terminated.

The crystallite structure and density of the pyrolytic carbon outer coating that is deposited on the surface of an article by decomposition of a hydrocarbon gas in a fluidized bed coating apparatus is dependent upon several independent variable conditions of operation. In general, the gaseous mixture which is fed through the coating apparatus to create the fluidized bed comprises a hydrocarbon gas and an inert gas. This inert gas is generally spoken of as the fluidizing or carrier gas and may be any suitable nonreactive gas, as for example helium, argon, nitrogen, etc. For a coating apparatus of a particular size, the primary variables are the temperature of the fluidized bed, the particular hydrocarbon gas being decomposed, the partial pressure of the hydrocarbon gas in the gas mixture which is used to both levitate the particles and serve as a source for the carbon, the total surface area of the articles which make up the fluidized bed, and the flow rate of the hydrocarbon gas (or contact time of the gas with the articles being coated).

Preferably, methane is used as the hydrocarbon gas to produce the isotropic outer layer. However, it should be understood that other hydrocarbon gases may be employed under suitable conditions which will result in similar isotropic carbon coatings. The coating conditions under which an isotropic carbon coating is deposited from a methane mixture, under certain conditions hereinafter enumerated, are shown in FIGURE 1. In this graph, the methane concentration in terms of partial pressure of the total gaseous mixture (total pressure of one atmosphere) is plotted against the bed temperature of the fluidized bed.

In the area of the graph labeled I, an isotropic carbon layer is deposited on the object being coated. In the areas labeled II, both at the left-hand side and at the upper right-hand corner of this graph, an anisotropic carbon layer having a crystalline structure termed "laminar" is deposited. In the area labeled III, at the upper center of this graph, a crystalline structure of a dense pyrolytic carbon is deposited which is termed "granular." As used in this application, these different carbon structures are defined as follows:

(1) Laminar carbon is that which possesses layer planes which are preferentially oriented parallel to the surface of the substrate, possesses various apparent crystallite sizes, has a density ranging from 1.5 to 2.2 g./c.c., and whose microstructure, when viewed metallographically under polarized light, is optically active and shows the typical "cross" pattern.

(2) Isotropic carbon is that which possesses very little preferred orientation, having a broad range of apparent crystallite sizes, a density which may vary from 1.4 to 2.2 g./c.c., and whose microstructure, when viewed metallographically under polarized light, is not optically active and is featureless.

(3) Granular carbon is that which is usually slightly oriented having a density in the area of 2.0 g./c.c. and relatively large apparent crystallite sizes and whose microstructure when viewed metallographically under polarized light, contains discrete grains.

Of course, the other operational variables, hereinbefore mentioned, also affect the crystalline structure of the carbon deposited. In this respect, FIGURE 1 is based upon a fluidized bed surface area (initial) of about 400 square centimeters and a contact time of the gas with the fluidized bed of about 0.1 second. Generally, any substantial change in the relationship between the two variables can result in some shifting of the boundaries between areas I, II, and III, as shown in FIGURE 1. This is discussed hereinafter.

Although from the graph, it may appear that the boundaries between areas I, II, and III are well-defined lines of demarcation, in actuality it should be realized that this is not the case. In general, the transformation from one crystalline structure to another in the general region of the boundary therebetween is somewhat gradual so that it might be properly said that one crystalline structure grades into the other. Moreover, it should be realized that although an isotropic carbon layer is produced under the deposition conditions for area I of the graph, the other properties, such as density and crystallite height, vary within the different parts of area I and are likewise dependent upon the other variables such as bed surface area and contact time. Various lines of density are shown on FIGURE 1.

It has been found that for operating conditions which result in a temperature of about 1500° C. at the exterior of the coating, a fast flux exposure of about $$1 \times 10^{22} \text{ NVT } (>0.18 \text{ m.e.v.})$$

and for burnup to about 20 atom percent of the metal nuclides the isotropic carbon layer should have a density of at least about 2.0 grams per cubic centimeter and preferably at least about 2.1. An isotropic carbon coating of this density has been found to have excellent strength and dimensional stability and to be able to accommodate a large elastic strain before fracturing. Moreover, within this density range, it is preferred that Bacon anisotropy factor is 1.2 or less because of the improved dimensional stability which such carbon has. For less severe operating conditions, coating of approximately higher anisotropy factor or lower density are satisfactory. When an outer coating of this character is employed on a nuclear fuel particle, the impermeability to gas exhibited by this dense isotropic carbon is sufficient to maintain therewithin substantially all of the volatile fission products generated in the nuclear fuel material.

It has been found that a suitable isotropic carbon coating of this density can be deposited using a bed temperature of at least about 2,000° C. and a methane concentration of about 15 volume percent methane in a methane-helium mixture, when coating is carried out using a bed surface area of about 1000 square centimeters and a contact time of about 0.15 second in a coater 3.8 centimeters in diameter. Variation of any of these parameters within reasonable limits continues to provide a pyrolytic carbon in the desired density range. In general, within reasonable limits of high bed areas, longer contact time and higher bed temperatures favor production of high density isotropic carbon.

The effect of the surface area of the bed upon the density of the isotropic carbon deposited under the conditions for which FIGURE 1 is constructed is shown graphically in FIGURE 2. The bed area is calculated as the surface area of the articles being coated at the beginning of the isotropic carbon coating step. Of course, it is realized that the surface area of the bed is constantly increasing as deposition of carbon takes place and the articles upon which the carbon is being deposited grow larger in size. When particles are being coated which fall in the general size range of about 100 to 500 microns in particle size, and when the coating layer being deposited is in the range of about 50 to 100 microns thick, respectively, no adjustment need be made to the coating condition variable to counteract this change between the total area at the beginning of the coating period and near the end thereof where the size of the particles has increased. However, as may be seen from FIGURE 2, an increase in the bed surface area increases the density of the pyrolytic carbon which is deposited, and it also shifts the boundary lines seen in FIGURE 1 slightly. Likewise, a decrease in bed area results in a decrease in density of the isotropic pyrolytic carbon deposited.

The effect of the contact time, or flow rate, of the hydrocarbon gas with the article upon which deposition is taking place is shown in FIGURE 3 using other criteria which corresponds to FIGURE 1. From FIGURE 3, it can be seen that an increase in the contact time of the hydrocarbon gas with the article upon which deposition is taking place (as for example by reducing the flow rate of the gas mixture through the fluidized bed coating apparatus so that the gas is in contact with the articles being coated for a longer period of time) serves to increase the density of the carbon being deposited, and it also slightly shifts the boundary lines seen in FIGURE 1. Likewise, a decrease in the contact time decreases the density, other conditions being held constant.

In addition to the foregoing considerations, the crystallite height or apparent crystallite size of the isotropic carbon is desirably in the range between about 100 to about 200 Angstroms. The apparent crystallite size, herein termed $L_c$, can be obtained directly from the coated articles, using an X-ray diffractometer. In this respect $$L_c = \frac{0.89\lambda}{\beta \cos \theta} A$$

wherein:

$\lambda$ is the wave length in Angstroms
$\beta$ is the half-height (002) line width, and
$\theta$ is the Bragg angle.

It has been found that an outer layer of isotropic carbon having a crystallite structure size in this range has excellent stability under high-level neutron irradiation It is believed that isotropic carbon in this crystallite size range is more resistant to damage resulting from continued neutron bombardment and thus is particularly well-suited for applications wherein the products will be subjected to a high neutron flux environment, as in the core of a nuclear reactor.

The following examples illustrate several processes for producing coated articles which point out various advantages of the invention. Although these examples include the best modes presently contemplated by the inventors for carrying out their invention, it should be understood that these examples are only illustrative and do not constitute limitations upon the invention which is defined by the claims which appear at the end of this specification.

EXAMPLE I

Particulate uranium dicarbide is prepared having a particle side of about 250 microns and being generally spheroidal in shape. The uranium used contains about 92% enrichment. A graphite reaction tube having an internal diameter of about 2.5 centimeters is heated to about 1100° C. while a flow of helium gas is maintained through the tube. When coating is ready to begin, the helium flow rate is increased to about 900 cc. per minute and a charge of 50 grams of the uranium dicarbide particles are fed into the top of the reaction tube. The flow of gas upward through the tube is sufficient to levitate the particles and thus create within the tube a fluidized particle bed.

When the temperature of the fuel particles reaches about 1100° C., acetylene gas is admixted with the helium to provide an upwardly flowing gas stream of the same flow rate but having a partial pressure of acetylene of about 0.80 (total pressure 1 atm.). The acetylene gas decomposes and deposits low density, spongy carbon upon the nuclear fuel particles. Under these coating conditions, the coating deposition rate is about 15 microns per minute. Flow of the acetylene is continued until a low density, spony, pyrolytic carbon coating about 25 microns thick is deposited upon the fuel particles. Then, the acetylene gas flow is terminated, and the particles are allowed to cool before their removal from this coating apparatus.

The coated charge of particles is then transferred to a slightly larger reaction tube having an internal diameter of about 3.8 centimeters. This tube is heated to about 2100° C. while a flow of helium gas of about 7,000 cc. per minute is passed therethrough. Under these conditions, the contact time is about 0.2 second. When the tube reaches the desired temperature, the spongy carbon-coated charge of particles is fed thereinto. A sufficient quantity of these particles, which now have diameters of about 300 microns, are fed into the reaction tube to provide a bed surface area of about 1000 cm.² When the temperature of the coated fuel particles reaches 2100° C., methane gas is admixed with the helium to provide the upflowing gas stream with a methane partial pressure of about 0.15 (total pressure 1 atm.), the total flow rate of gas remaining at about 7,000 cc. per minute. The methane decomposes to deposit a dense isotropic pyrolytic carbon coating over the spongy carbon coating. Under these coating conditions, the carbon deposition rate is about one-third to one micron per minute. The methane gas flow is continued until an isotropic pyrolytic carbon coating about 85 microns thick is obtained. At this time the methane gas flow is terminated, and the coated fuel particles are cooled fairly slowly in helium and then removed from the reaction tube.

The resultant particles are examined and tested. The density of the outer isotropic carbon layer is found to be about 2.1 grams per cc. The Bacon anisotropy factor is found to be about 1.1 to 1.2. The apparent crystallite size is measured and found to be about 130 to 150 A.

An additional charge of uranium dicarbide particles of a particle size of about 250 microns is prepared. This 50-gram charge is coated with a low density, spongy carbon in the same manner that the above-described particles were coated, providing a 25-micron thick coating on each particle. The charge is then coated with an outer layer of laminar pyrolytic carbon using a 3.8 cm. I.D. reaction tube and a flow rate of gas of about 7,000 cc. per minute, as described above, but employing a methane partial pressure of about 0.40 and a bed temperature of about 1400° C. Coating is continued until a layer about 85 microns thick of laminar pyrolytic carbon is obtained. These coated particles are cooled, removed, examined, and tested. The density of the laminar outer layer is about 2.0 grams per cc. The Bacon anisotropy factor is about 2.0 to 6.0. The apparent crystallite size is about 40 A.

These two charges of coated particles are disposed in a suitable capsule and subjected to neutron irradiation at an average fuel temperature of about 1250° C. for about one month. During this time, the fast-flux exposure is estimated to be about $10 \times 10^{20}$ cm.$^2$/sec. NVT (using neutrons of an energy greater than about 0.18 m.e.v.). At the completion of this period, the burnup is estimated to be about 10 to 20 percent of the fissile atoms. For the particles coated with the isotropic carbon outer layer, the xenon–133 release fraction is less than about $1 \times 10^{-5}$. The release fraction of xenon–133 from the other group of particles, coated with the laminar pyrolytic carbon outer layer is higher than about $10^{-3}$. Moreover, the fuel particles with the isotropic pyrolytic carbon outer layer exhibit no coating failures after about 10 to 20 percent burnup. After the same amount of burnup, the laminar-coated particles exhibit a high percentage of coating failures.

EXAMPLE II

A 50-gram charge of uranium dioxide particles having a particle size of about 250 microns is prepared. These particles are coated with a 25-micron thick layer of low density, spongy pyrolytic carbon in the same manner as set forth in Example I. Next, the particles coated with an outer layer of dense isotropic carbon, again using the same coating conditions as specified in Example I. Coating is continued at these conditions until about an 80-micron thick coating of pyrolytic carbon is obtained.

The coated particles are cooled, removed from the coating apparatus, examined and tested. The density of the isotropic carbon outer layer measures about 2.1 grams per cc. The Bacon anisotropy factor is about 1.1 to 1.2. The apparent crystallite size of the outer layer is about 140 A. After high temperature irradiation under the conditions as set forth in Example I, these particles show a xenon–133 release fraction of less than about $2 \times 10^{-5}$. Moreover, after about 10 to 20% burnup of the fissile atoms takes place, essentially no coating failures are observed.

EXAMPLE III

A charge of 200-micron diameter spheroidal particles of $UO_2$ is prepared having a density of about 8.0 g./cc., about 80% of theoretical maximum density. A charge of the particles having a total surface area of 800 square centimeters is fed into a 3.8 cm. I.D. reaction tube. When the bed temperature reaches about 2200° C. a methane-helium mixture is fed through the tube at atmospheric pressure using a methane partial pressure of about 0.15 and a contact time of about 0.10 second. Coating is continued until a 100-micron thick layer of isotropic pyrolytic carbon is obtained. At the end of this time, the methane flow is discontinued, and the particles are cooled and removed.

The density of the isotropic pyrolytic carbon layer is about 2.1 grams per cm. The Bacon anisotropy factor is about 1.05. The apparent crystallite size is about 110 A. The xenon–133 release factor of the particles for irradiation for the conditions set forth in Example I is less than about $10^{-5}$. Burnup of approximately 10% of the fissile atoms causes essentially no coating failures.

EXAMPLE IV

A charge of 250-micron $UO_2$ particles is prepared having a density of about 8.0 g./cc., about 80% of theoretical maximum density, and being spheroidal in shape. A charge of the particles having a total surface area of 400 square centimeters is fed into a 2.5 cm. I.D. reaction tube. When the bed temperature reaches about 1650° C. a methane-helium mixture is fed through the tube at atmospheric pressure using a methane partial pressure of about 0.15 and a flow rate of about 4600 cc./min. (contact time of about 0.10 second). At these reaction conditions, the coating deposition rate of isotropic pyrolytic carbon is about 1.5 microns per minute. Coating is continued until a 120-micron thick layer of isotropic carbon is obtained. At the end of this time, the methane flow is discontinued, and the particles are cooled and removed.

The density of the isotropic pyrolytic carbon layer is about 1.5 grams per cm. The Bacon anisotropy factor is about 1.05. The apparent crystallite size is about 50 A. The xenon–133 release factor of the particles for irradiation for the conditions set forth in Example I is about $10^{-3}$. Burnup of approximately 10% of the fissile atoms causes considerable coating failures.

EXAMPLE V

Boron carbide neutron poison particles having an average size of approximately 100 microns are coated with a low density, shock-absorbing spongy carbon layer as set forth in Example I above, about 25 microns thick. The spongy carbon-coated particles having a total surface area of about 2000 square centimeters are transferred to a 3.8 cm. diameter coater and are coated with an 25-micron thick coating of isotropic pyrolytic carbon using a bed temperature of 2100° C., a gas flow rate of about 7000 cm.$^3$/min. of a helium-methane mixture having a partial pressure of methane of about 0.15 (contact time about 0.2 second). The coated boron carbide particles are then cooled, removed from the tube, and examined and tested.

The density of the outer isotropic pyrolytic carbon layer is about 2.1 grams per cm. The Bacon anisotropy factor is about 1.1. The apparent crystallite size is about 130 A.

The coated boron carbide particles show increased resistance to thermal and irradiation stresses and have excellent vapor retention at temperatures where a fairly high vapor pressure of boron carbide exists. These coated neutron poison particles are considered well suited for use in nuclear energy applications wherein they will be exposed to high temperatures and high-density neutron irradition for prolonged periods of time.

EXAMPLE VI

A charge of boron carbide poison particles having an average size of approximately 100 microns having a total surface area of about 1000 sq. cm. is disposed in a 3.8 cm. diameter coater. The particles are coated with a 50-micron thick coating of isotropic pyrolytic carbon using a bed temperature of 2200° C., a gas flow rate of about 7,000 cm.$^3$/min. of a helium-methane mixture having a partial pressure of methane of about 0.15 (contact time about 0.2 second). The coated boron carbide particles are then cooled and removed from the tube.

The density of the isotropic pyrolytic carbon layer is about 2.1 grams per cm. The Bacon anisotropy factor is about 1.1. The present crytallite size is about 130 A.

The coated baron carbide particles show increased resistance to thermal and irradiation stresses and have excellent vapor retention at temperatures where a fairly high vapor pressure of boron carbide exists. These coated neutron poison particles are considered well suited for use in nuclear energy applications wherein they will be exposed to high temperatures and high-density neutron irradiation for prolonged periods of time.

Although the invention has been particularly described with respect to certain fissionable fuels, i.e. uranium dicarbide and uranium dioxide, and to boron carbide, it should be understood that other fissionable materials and other poisons can likewise be provided with protective coatings using the aforementioned processes to provide them with increased high temperature and neutron irradiation stability. For instance, mixtures of uranium carbide and thorium carbide may be coated using these processes to provide fissile-fertile fuel particles. Likewise, various shaped articles can be provided with these improved coatings; although a process for coating particles has been described, it should be understood that similar coatings may be applied to other shapes, such as rods, discs, rings, etc.

The foregoing shows that articles are provided which have increased structural stability when subjected to thermal and irradiative stress. Additionally, fissionable fuel products which have increased stability and excellent fission product retention characteristics are provided. Moreover, a nuclear poison with increased high temperature structural stability is likewise provided. Various features of the invention are set forth in the following claims.

What is claimed is:

1. A coated article having increased stability under prolonged exposure to high temperature and neutron irradiation, which article comprises a central core selected from the group consisting of nuclear fuel materials and neutron poison materials, and a protective coating surrounding said core, said coating including a dense continuous jacket of isotropic carbon which isotropic carbon has good structural strength and dimensional stability under conditions of high temperature and high neutron irradiation, said isotropic carbon jacket completely surrounding said core.

2. A coated article having increased stability under prolonged exposure to high temperature and neutron irradiation, which article comprises a central core selected from the group consisting of nuclear fuel materials and neutron poison materials, and a protective coating surrounding said core, said coating including a dense continuous jacket of isotropic carbon of a density of at least about 2.0 grams per cc., which isotropic carbon has good structural strength and dimensional stability under conditions of high temperature and high neutron irradiation, said isotropic carbon jacket completely surrounding said core.

3. A coated article having increased stability under prolonged exposure to high temperature and neutron irradiation, which article comprises a central core selected from the group consisting of nuclear fuel materials and neutron poison materials, and a protective coating surrounding said core, said coating including a dense continuous jacket of isotropic carbon of a density of at least about 2.0 grams per cc. and an apparent crystallite size of at least about 100 A., which isotropic carbon has good structural strength and dimensional stability under conditions of high temperature and high neutron irradiation, said isotropic carbon jacket completely surrounding said core.

4. A coated article having increased stability under prolonged exposure to high temperature and neutron irradiation, which article comprises a central core selected from the group consisting of nuclear fuel materials and neutron poison materials, and a protective coating surrounding said core, said coating having a thickness equal at least about 40% of the size of said core, said coating including a dense continuous jacket of isotropic carbon having a density of at least about 2.0 grams per cc. which isotropic carbon has good structural strength and dimensional stability under conditions of high temperature and high neutron irradiation, said isotropic carbon jacket having a thickness of at least about 10 microns and completely surrounding said core.

5. A coated article having increased stability under prolonged exposure to high temperature and neutron irradiation, which article comprises a central core selected from the group consisting of nuclear fuel materials and neutron poison materials, a layer of a low density substance surrounding said core, said low density layer having a thickness of at least about 20 microns, and a dense isotropic carbon layer exterior of said low density layer, which isotropic carbon coating has good structural strength under conditions of high temperature and high neutron irradiation, said isotropic carbon layer providing continuous jacket exterior of said low density layer.

6. A coated article having increased stability under prolonged exposure to high temperature and neutron irradiation, which article comprises a central core selected from the group consisting of nuclear fuel materials and neutron poison materials, a layer of a low density carbon substance surrounding said core, said low density carbon layer having a thickness of at least about 20 microns, and a dense isotropic carbon layer exterior of said low density layer, which isotropic carbon coating has good structural strength under conditions of high temperature and high neutron irradiation, said isotropic carbon layer providing a continuous jacket exterior of said low density carbon layer.

7. A coated article having increased stability under prolonged exposure to high temperature and neutron irradiation, which article comprises a central core selected from the group consisting of nuclear fuel materials and neutron poison materials, and a protective coating surrounding said core, said coating including a layer at least about 20 microns thick of low density pyrolytic carbon adjacent said core, and a dense isotropic carbon layer exterior of said low density layer, which isotropic carbon layer has good structural strength under conditions of high temperature and high neutron irradiation, said isotropic carbon layer having a density of at least about 2.0 grams per cc. and providing an integral jacket exterior of said low density carbon layer, said low density pyrolytic carbon layer having a density at least about 25 percent less than the density of said dense isotropic carbon.

8. A coated article having increased stability under prolonged exposure to high temperature and neutron irradiation, which article comprises a central core selected from the group consisting of nuclear fuel materials and neutron poison materials, and a protective coating surrounding said core, said coating having a thickness of at least about 40% of the size of the core, said coating including a layer of low density pyrolytic carbon adjacent said core, said pyrolytic carbon layer having a thickness of between about 20 microns and about 50 microns, and a dense isotropic carbon layer exterior of said low density layer, which isotropic carbon layer has good structural strength under conditions of high temperature and high neutron irradiation, said isotropic carbon layer having a density of at least 2.0 grams per cc. having a thickness of at least about 10 microns and providing an integral jacket surrounding said low density carbon layer, said low density pyrolytic carbon layer having a density at least about 25 percent less than the density of said dense isotropic carbon.

9. A coated article having increased stability under prolonged exposure to high temperature and neutron irradiation, which article comprises a central core of a spheroidal particle of nuclear fuel material and a protective coating surrounding said core, said coating having a thickness between about 40 and about 50% of the diameter of said core and including a layer of spongy pyrolytic carbon adjacent said core, said spongy carbon layer having a density about one-half the theoretical density of carbon or less and having a thickness of at least about 25 microns, and a dense isotropic carbon layer exterior of said low density layer, which isotropic carbon layer has good structural strength under conditions of high temperature and high neutron irradiation, said isotropic carbon layer having a thickness of at least 10 microns, having a Bacon anisotropy factor of 1.2 or less, having a density of at least about 2.1 grams per cc. having an apparent crystallite size of between about 100 and 200 A., and providing an integral jacket surrounding said low density carbon layer.

10. A coated article having increased stability under prolonged exposure to high temperature and neutron irradiation, which article comprises a central core of a porous particle of nuclear fuel material having a density about 85% of the theoretical maximum density or less and a protective coating surrounding said core, said coating including a layer of dense isotropic pyrolytic carbon adjacent said core, which isotropic carbon layer has good structural strength under conditions of high temperature and high neutron irradiation, said isotropic carbon having a Bacon anisotropy factor of 1.2 or less, having a density of at least about 2.1 grams per cc. having a thickness equal to at least about 40% of the size of said core, having an apparent crystallite size of between about 100 and 200 A., and providing an integral jacket surrounding said low density carbon layer.

References Cited by the Examiner

UNITED STATES PATENTS 3,129,188  4/1964  Sowman et al. _____ 176—91 X
3,151,037  9/1964  Johnson et al. _____ 176—91 X

OTHER REFERENCES

A.E.C. Report BMI-1468, October 1960, pp. 8 and 11.
Reactor Materials, 1963–1964, vol. 6, No. 4, page 26.

CARL D. QUARFORTH, *Primary Examiner.*

BENJAMIN R. PADGETT, *Examiner.*

M. J. SCOLNICK, *Assistant Examiner.*